United States Patent [19]
Bristow et al.

[11] Patent Number: 6,167,361
[45] Date of Patent: Dec. 26, 2000

[54] RACING VEHICLE FOUR-LINK CONFIGURATION METHOD AND APPARATUS

[76] Inventors: Michael R. Bristow, 2552 E. Carol Ave., Mesa, Ariz. 85204; Robert L. Edwards, 1533 B. Mineral Rd., Gilbert, Ariz. 85234; James E. Harwood, 454 W. Brown Rd., Mesa, Ariz. 85201

[21] Appl. No.: 09/414,143

[22] Filed: Oct. 7, 1999

[51] Int. Cl.[7] .................................................... G06G 7/48
[52] U.S. Cl. ...................................................... 703/8; 703/1
[58] Field of Search .................................... 703/8, 2, 1, 6; 280/124.111, 276, 86.75; 180/348, 311; 403/400; 33/612, 608

[56] References Cited

U.S. PATENT DOCUMENTS

| | | | |
|---|---|---|---|
| 4,416,064 | 11/1983 | Hurst | 33/612 |
| 5,458,359 | 10/1995 | Brandt | 280/124.111 |
| 5,749,590 | 5/1998 | Roerig | 280/276 |
| 5,803,200 | 9/1998 | Brandt | 180/348 |
| 5,971,654 | 10/1999 | Sweeney, Jr. | 403/400 |
| 6,042,131 | 3/2000 | Bailey | 280/86.75 |

*Primary Examiner*—Tod R. Swann
*Assistant Examiner*—Russell W. Frejd
*Attorney, Agent, or Firm*—Ellis Venable & Busam LLP

[57] ABSTRACT

The present invention includes a method and computer program for determining possible configurations of a racing vehicle Four-Link assembly. A user of the computer program is prompted for measurements of the Four-Link assembly bracket apertures relative to the garage floor. The measurements are entered into the computer program to produce reference points for the vehicle. The computer program then permits a calculation of lines comprised of the relevant Four-Link assembly bracket apertures and an interpolation of points on each line representing a possible Four-Link configuration. The computer program then renders either a video display and/or a printout of the possible Four-Link configurations and the intersect points of the lines created by the interpolated lines representing Four-Link configurations.

14 Claims, 4 Drawing Sheets

RACING VEHICLE FOUR-LINK CONFIGURATION METHOD AND APPARATUS

FIELD OF THE INVENTION

The present invention relates to the field of construction and maintenance of racing vehicles. More particularly, the present invention relates to the field of configuring the rear axle and chassis of racing vehicles. Still more particularly, the present invention relates to the field of configuring a Four-Link assembly of a drag racing vehicle.

BACKGROUND

The formula for a winning drag race vehicle consists of many optimally adjusted variables. Several of these variables comprise complex mechanical structures. Equally important is the interrelation of these structures. One critically important variable in drag racing vehicle performance involves the alignment, or relative configuration, of the rear axle assembly and vehicle main chassis alignment.

Aligning the rear axle assembly and vehicle main chassis of drag racing vehicles typically comprises configuring an adjustably securable mechanical link that couples the rear axle assembly to the vehicle main chassis. This adjustably securable mechanical link is typically referred to in the racing industry as a "Four-link" assembly because four bars connect, or link, the rear axle assembly to the main vehicle chassis. FIG. 1 depicts a typical drag racing vehicle Four-Link assembly.

In the current state of the art, Four-Link assembly configuration and adjustment requires consideration of a combination of variables including without limitation, vehicle dimensions, vehicle chassis height, vehicle weight distribution, tire size, tire inflation pressure, horsepower, torque, and road conditions. One previous method of Four-Link configuration and adjustment was complex, laborious, and prone to errors. The method generally required measuring the relative positions of several vehicle components including, rear axle position, rear axle assembly mounting apertures, vehicle main chassis mounting apertures. Next, a sketch of the relative positions of the vehicle components was transferred either to the ground beneath the vehicle or on the wall alongside the vehicle. Finally, each possible combination of rear axle assembly mounting aperture and vehicle main chassis bracket mounting aperture was plotted to determine each possible Four-Link configuration. A racing vehicle construction or maintenance professional would then select one the possible Four-Link configurations after considering the variables listed above.

The primary problem with the above method is the rigidity of the results. If one of the other variables listed above that effects the dimensions of the vehicle was varied by the race professional, an entirely new set of possible configurations would need to be plotted. Thus, it would be advantageous in the art of drag racing vehicle construction to have an automated method and apparatus for determining the multitude of possible Four-Link setups that enables consideration of variations of the variables listed above.

SUMMARY OF THE INVENTION

It is an object of the present invention to provide a method and apparatus for configuring and adjusting a Four-Link assembly of a drag racing vehicle.

The present invention comprises a method and computer program for determining possible configurations of a racing vehicle Four-Link assembly. A user of the computer program manifesting the method is prompted for measurements of the Four-Link assembly bracket apertures relative to the garage floor. The measurements are entered into a computer program to produce reference points for the vehicle. The computer program then permits a calculation of lines comprised of the relevant Four-Link assembly bracket apertures and an interpolation of points on each line representing a possible Four-Link configuration. The computer program then renders either a video display and/or a printout of the possible Four-Link configurations and the intersect points of the lines created by the interpolated lines representing Four-Link configurations.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

The present invention, Racing Vehicle Four-Link Configuration Method and Apparatus 1, is useful for configuring and adjusting a Four-Link assembly 10 of a drag racing vehicle. The method 1 uses information about the racing vehicle dimensions to calculate a plurality of projected intersect points 100 representing every Four-Link assembly 10 configuration possible. Thereafter, a skilled drag race construction and maintenance professional can survey the plurality of projected intersect points 100 and select one of said points 100 that corresponds to one of said possible Four-Link assembly 10 configurations. By using said method, the professional can more easily select the Four-Link assembly 10 configuration believed to be optimal for that particular racing vehicle under the current racing conditions.

Figure 1:
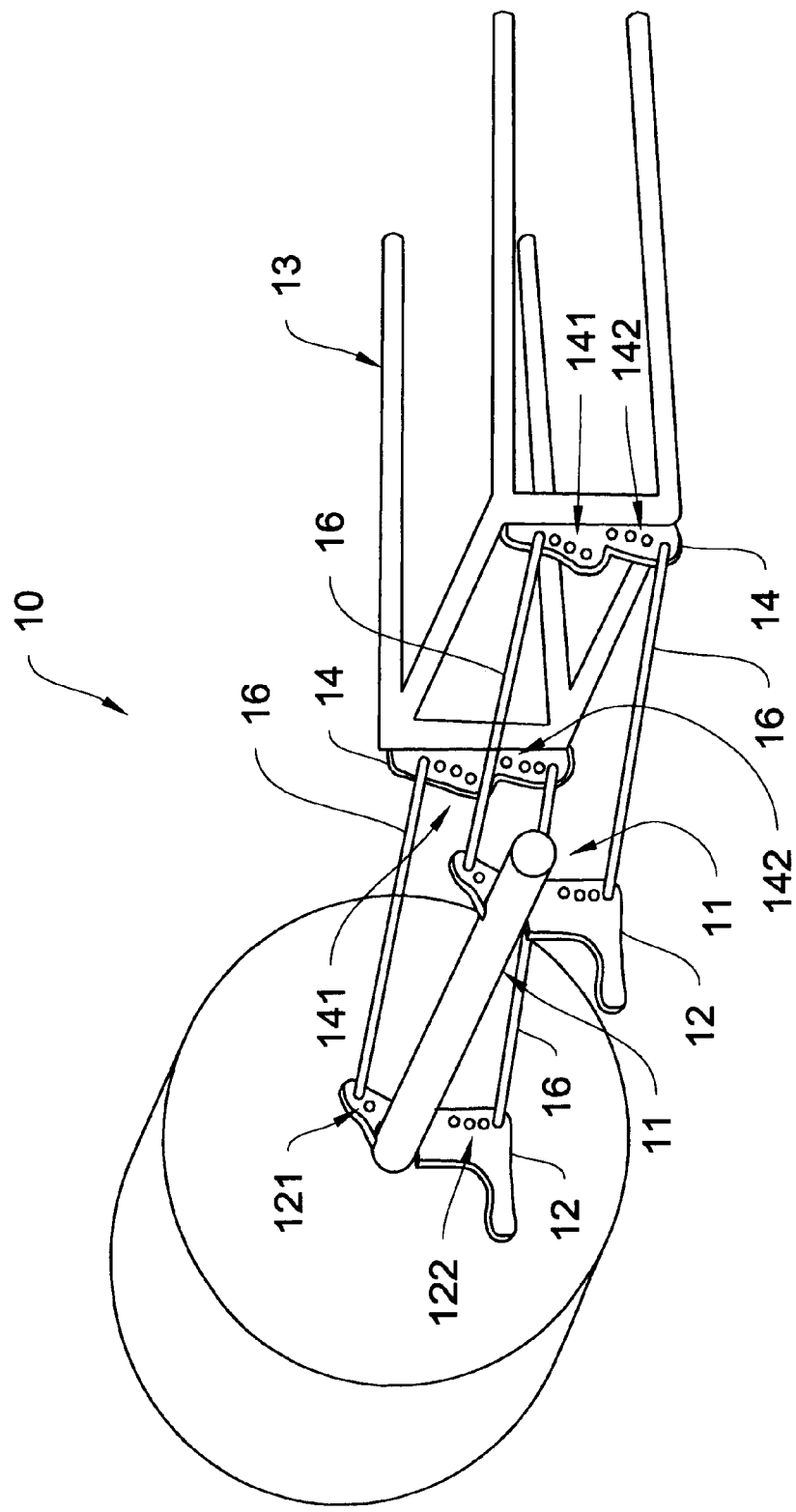
FIG. 1 depicts a racing vehicle Four-Link assembly.
Figure 2:
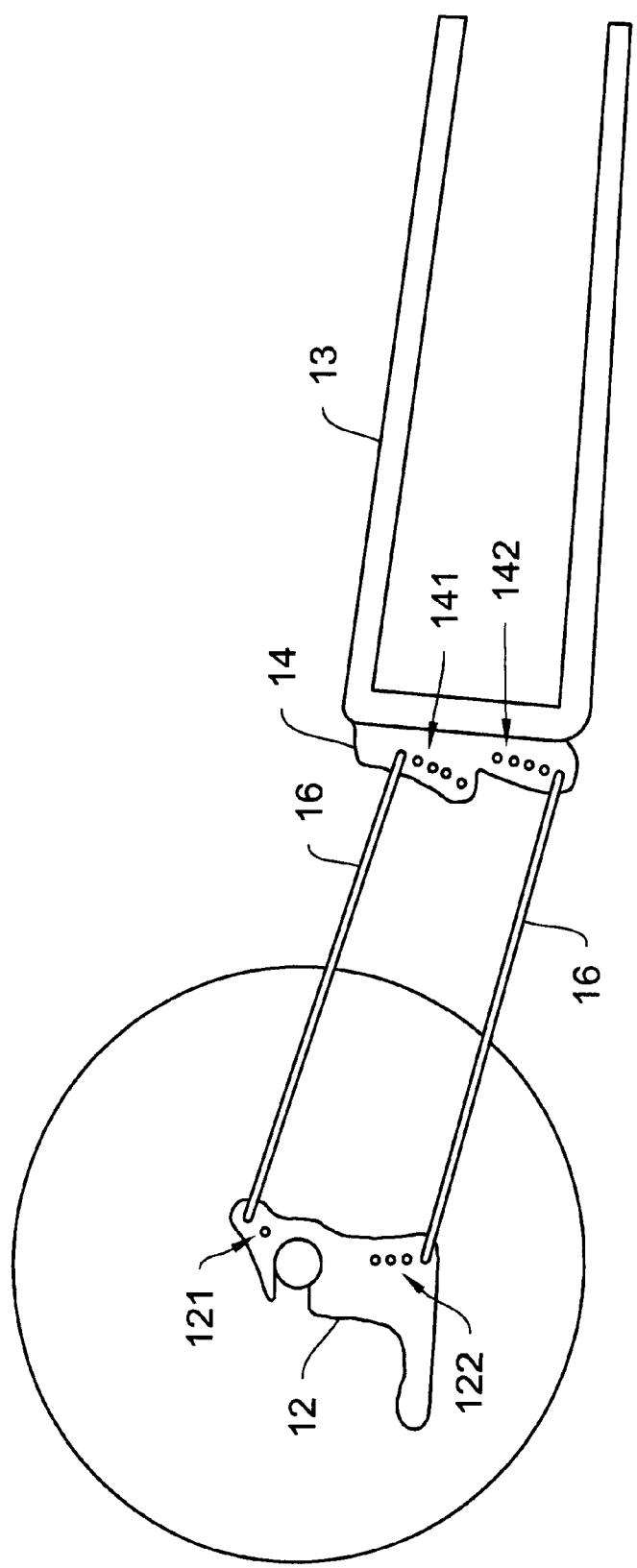
FIG. 2 depicts a side view of the racing vehicle bracket apertures.

The Four-Link assembly 10 couples the rear axle assembly 11 to the vehicle chassis 13 and generally comprises two rear axle assembly brackets 12, two vehicle chassis brackets 14, and four (4) bars 16. Each rear axle assembly bracket 12 is secured to the rear axle assembly 11 at a position laterally displaced relative to the other rear axle assembly bracket 12. Likewise, each vehicle chassis bracket 14 is secured to the vehicle main chassis 13 at a position laterally displaced relative to the other vehicle chassis bracket 14. Each bar 16 is secured at distal ends to one of said rear axle assembly brackets 12 and on of said vehicle chassis brackets 14. See FIG. 1.

To enable securing the bars 16, each rear axle assembly bracket 12 has a plurality of upper rear axle bracket apertures 121 and lower rear axle bracket apertures 122. Each vehicle chassis bracket 14 has a plurality of upper chassis bracket apertures 141 and lower chassis bracket apertures 142. Moreover, each of the four bars 16 have mounting hardware 161 at each distal end including a bolt 162 designed to engage the bracket apertures 121, 122, 141, and 142. Thus, two bars 16 are securable between the upper rear axle bracket apertures 121 and the upper chassis bracket apertures 141, and two bars 16 are securable between the lower rear axle bracket apertures 122 and the lower chassis bracket apertures 142. The resulting Four-Link assembly creates a strong rectangular linkage between the rear axle assembly 11 and the vehicle main chassis 13 and the plurality of bracket apertures 121, 122, 141, and 142, enables several different Four-Link assembly 10 configurations.

The preferred embodiment of the present invention is implemented by a computer program. It is within the scope of the invention to host the computer program on a computer server remote from the user and include user license verification routines. The remote user may connect by any manner ordinary in the art. The program prompts a user for particular information about the racing vehicle and then calculates the plurality of projected intersect points 100 representing every Four-Link assembly 10 configuration possible. The points 100 are then formatted for display by the program.

Figure 3:
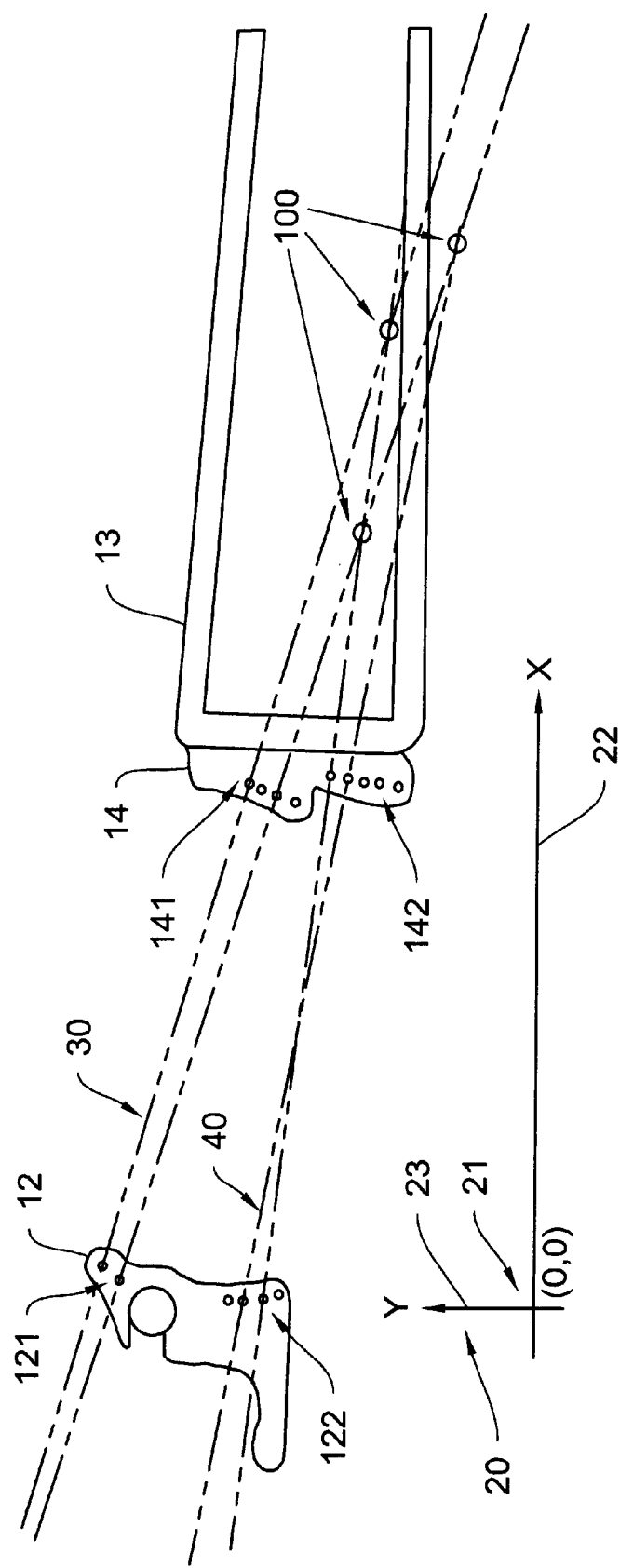
FIG. 3 depicts a side view of the racing vehicle bracket apertures and the intersecting lines representing Four-Link assembly configurations
Figure 4:
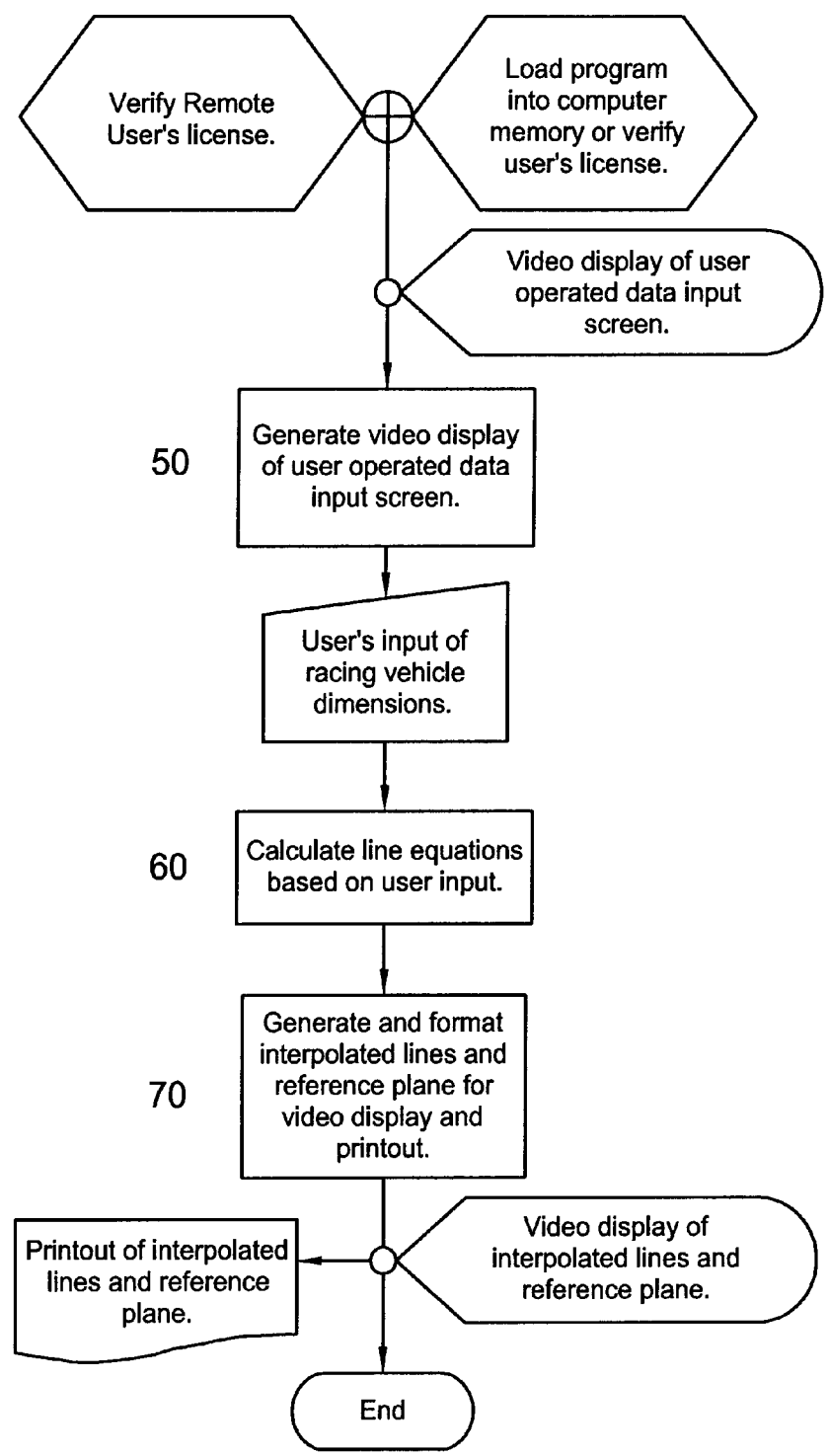
FIG. 4 depicts a flowchart for performing the racing vehicle Four-Link assembly configuration steps.

To calculate the intersect points 100, a reference plane 20 is established from at least three apertures. See FIG. 3. The at least three apertures are selected from at least three of the groups consisting of; the upper rear axle assembly bracket apertures 121, the lower rear axle assembly bracket apertures 122, the upper chassis bracket apertures 141, and the lower chassis bracket apertures 142. Preferable, one aperture is chosen from each group. i.e. one upper rear axle assembly bracket aperture 121, one lower rear axle assembly bracket aperture 122, one upper chassis bracket aperture 141, and one lower chassis bracket aperture 142. Moreover, a reference origin 21 having an x-reference axis 22 and a y-reference axis 23 is established on said reference plane 20. A convenient point for said reference origin 21 is at a point on the garage floor directly beneath the vehicle rear axle.

In the program implementing the present invention, an interactive user screen 50 prompts the program user to select a convenient position for said reference origin 21. Moreover, on the same screen, the user is also prompted for the positions of the bracket apertures 121, 122, 141, and 142 relative to the reference origin 21. Next, a calculating routine 60 within the computer program formulates the line equations representing each possible Four-Link configuration.

One set of first lines 30 on the reference plane 20 are interpolated for each combination of upper rear axle assembly bracket apertures 121 and upper chassis bracket apertures 141. A set of second lines 40 on the reference plane 20 are interpolated for each combination of lower rear axle assembly bracket apertures 122 and lower chassis bracket apertures 142. First line slopes are calculated by comparing the relative positions, on the reference plane 20, of each combination of upper rear axle assembly bracket apertures 121 and upper chassis bracket apertures 141. First line y-intercepts of the x-reference axis 22 are also calculated. Second line slopes are calculated by comparing the relative positions, on the reference plane 20, of each combination of lower rear axle assembly bracket apertures 122 and lower chassis bracket apertures 142. Second line y-intercepts of the x-reference axis 22 are also calculated.

A display routine 70 of the computer program formats the first set of lines 30 and the second set of lines 40 for display on a computer video display terminal or on a computer hardcopy printout. The display routine 70 also displays the reference plane 20 and reference origin 21 to provide an easy to use reference for the drag racing vehicle.

The relative x and y coordinates for each intersection of first and second lines on the reference plane 20 can be calculated from the determinations made above. The x-coordinate of each intersection of the first lines and second lines is determined by calculating ratio of; the difference of the corresponding second line y-intercept and the corresponding first line y-intercept, and the difference of the corresponding first line slope and the corresponding second line slope. i.e.;

$$\text{x-coordinate of intersection} = (b2-b1)/(m2-m1),$$

where;

$b2$=second line y-intercept, $b1$=first line y-intercept, $m1$=first line slope, $m2$=second line slope.

The y-coordinate of each intersection of the first lines 30 and second lines 40 is determined by calculating the y-value of one line using the x-coordinate. e.g.;

$$\text{y-coordinate of each intersection} = m1(\text{x-coordinate of intersection}) + b1.$$

where;

$b1$=first line y-intercept, $m1$=first line slope.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A computer implemented method of determining a configuration of a racing vehicle Four-Link assembly, comprising the steps of:
   A. establishing a reference plane comprised of at least three apertures, each aperture selected from one of the groups consisting of; a plurality of upper rear axle assembly bracket apertures, a plurality of lower rear axle assembly bracket apertures, a plurality of upper chassis bracket apertures, a plurality of lower chassis bracket apertures;
   B. interpolating at least first and second lines on said reference plane,
      i. said first line, composed by a first interpolation of apertures on said reference plane and including, an aperture selected from the group consisting of said upper rear axle assembly bracket apertures and an aperture selected from the group consisting of said upper chassis bracket apertures,
      ii. said second line, composed by a second interpolation of apertures on said reference plane and including, an aperture selected from the group consisting of said lower rear axle assembly bracket apertures and an aperture selected from the group consisting of said lower chassis bracket apertures,
   C. interpolating an intersection of said at least first and second lines on said reference plane; and
   D. rendering by computer, a display of said intersection of said at least first and second lines on said reference plane, the display of the intersection of the at least first and second lines representing the configuration of the racing vehicle Four-Link assembly.

2. The method in claim 1 wherein said step of, interpolating an intersection of said at least first and second lines on said reference plane, further comprises the steps of:
   A. establishing a reference origin having an x-reference axis and an orthogonal y-reference axis on said reference plane;
   B. determining a first line slope of said first line on said reference plane by,
      i. comparing said upper rear axle assembly bracket aperture and said upper chassis bracket aperture to obtain a first line x-displacement and a first line y-displacement,
      ii. calculating a first line ratio consisting of said first line x-displacement and said first line y-displacement,
   C. determining a second line slope of said second line on said reference plane by,
      i. comparing said lower rear axle assembly bracket aperture and said lower chassis bracket aperture to obtain a second line x-displacement and a second line y-displacement,
      ii. calculating a second line ratio consisting of said second line x-displacement and said second line y-displacement;
   D. calculating where said second line intersects said y-reference axis to obtain a second line y-intercept;
   E. calculating where said first line intersects said y-reference axis to obtain a first line y-intercept;
   F. comparing said second line y-intercept and said first line y-intercept to obtain a y-intercept difference;
   G. comparing said first line ratio and said second line ratio to obtain a slope difference; and
   H. calculating a ratio of said y-intercept difference and said slope difference.

3. The method in claim 2, further comprising the step of:
   A. calculating a sum of;
      i. said first line y-intercept, and
      ii. a product of said first line slope, and the ratio of said y-intercept difference and said slope difference.

4. The method in claim 2 wherein said reference origin is a point on a line bisecting a cross-section of a racing vehicle rear axle.

5. The method in claim 4 wherein said x-reference axis cross-sects said racing vehicle rear axle.

6. The method in claim 1 wherein the step of establishing a reference plane, comprises establishing a reference plane comprised of at least four apertures, each aperture selected from one of the groups consisting of; a plurality of upper rear axle assembly bracket apertures, a plurality of lower rear axle assembly bracket apertures, a plurality of upper chassis bracket apertures, a plurality of lower chassis bracket apertures.

7. A computer implemented program for determining a configuration of a racing vehicle Four-Link assembly, comprising;
   A. an interactive user routine for inputting the relative positioning of at least one rear axle assembly bracket aperture and at least one vehicle chassis bracket aperture;
   B. a calculating routine that determines a slope and interpolates a first line comprised of said at least one rear axle assembly bracket aperture and said at least one vehicle chassis bracket aperture; and
   C. a display routine for rendering a display of said first line, the first line representing the configuration for the racing vehicle Four-Link assembly.

8. The computer program in claim 7, said interactive user routine further enabling inputting the relative positioning of a second rear axle assembly bracket aperture and a second vehicle chassis bracket aperture; said calculating routine further determines a second slope and interpolates a second line comprised of said second rear axle assembly bracket aperture and said second vehicle chassis bracket aperture; said display routine further rendering a display of the second line.

9. The computer program in claim 7 wherein said program is hosted on a computer remote from a computer user.

10. The computer program in claim 9 wherein said program is hosted on a computer remote from a computer user and said computer user accesses the program via a distributed computer network.

11. A computer implemented method of determining a configuration of a racing vehicle Four-Link assembly, comprising the steps of:
   A. inputting into computer memory, relative position measurements of a rear axle bracket relative to a upper chassis bracket, and a lower rear axle bracket relative to a lower rear chassis bracket;

B. interpolating an intersection of first and second lines using a computer routine that operates on the relative positioning measurements, the first line comprised of the relative position measurements of the upper rear axle bracket and the upper chassis bracket, the second line comprised of the relative position measurements of the lower rear axle bracket and the lower rear chassis bracket;

C. rendering by computer, a display of the intersection of the first and second lines, the display of the intersection of the first and second lines representing the configuration of the racing vehicle Four-Link assembly.

12. The method of claim 11 wherein the step of inputting into computer memory relative position measurements comprises inputting into computer memory the relative position measurements of four apertures, each of the four aperture selected from one of the groups consisting of; a plurality of upper rear axle assembly bracket apertures, a plurality of lower rear axle assembly bracket apertures, a plurality of upper chassis bracket apertures, a plurality of lower chassis bracket apertures.

13. The method of claim 11 wherein the step of inputting into computer memory relative position measurements is performed remotely from a server on which the step of interpolating an intersection of first and second lines using a computer routine is performed.

14. The method of claim 11 wherein the step rendering by computer, a display of the intersection of the first and second lines, is performed remotely from a server on which the step of interpolating an intersection of first and second lines using a computer routine is performed.

* * * * *

UNITED STATES PATENT AND TRADEMARK OFFICE
CERTIFICATE OF CORRECTION

PATENT NO. : 6,167,361

DATED : December 26, 2000

INVENTOR(S) : Michael Bristow, et al

It is certified that error appears in the above-identified patent and that said Letters Patent is hereby corrected as shown below:

Column 4, line 41 change "(m2-m2) " to read ---- (m1-m2) ------.

Signed and Sealed this

Twenty-ninth Day of May, 2001

*Attest:*

NICHOLAS P. GODICI

*Attesting Officer*    *Acting Director of the United States Patent and Trademark Office*